INVENTOR.
TIES S. te VELDE
BY

AGENT

United States Patent Office 3,480,818
Patented Nov. 25, 1969

3,480,818
ELECTRICAL MONOGRAIN LAYERS HAVING A RADIATION PERMEABLE ELECTRODE
Ties Siebolt te Velde, Emmasingel, Eindhoven, Netherlands, assignor, by mesne assignments, to U.S. Philips Corporation, New York, N.Y., a corporation of Delaware
Filed Aug. 1, 1966, Ser. No. 569,204
Claims priority, application Netherlands, Aug. 4, 1965, 6510095
Int. Cl. H01j 39/04, 13/28, 17/24
U.S. Cl. 313—94        12 Claims

ABSTRACT OF THE DISCLOSURE

An electrical device comprising a layer of electrically active grains substantially one grain thick provided with electrodes, of which one of the electrodes which is intended to permit radiation to pass through it to the grains or radiation from the grains through it to the outside includes first regions located over the spaces between the grains and second regions located over the grains. The first regions have high electrical conduction but low permeability to the radiation, whereas the second regions have lower electrical conduction but higher radiation permeability. In one embodiment, the second regions located over the grains are thinner than the first regions located over the grain spaces.

---

Figure 1:
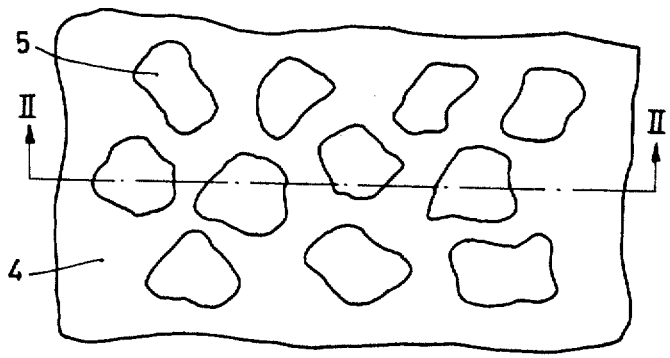

The invention relates to a sandwich-shaped electrical device comprising a layer of active grains provided between two electrodes, in particular a layer of semiconductor grains having substantially the thickness of one grain. The layer of grains comprises at least over part of its thickness an electrically insulating filler in the spaces between the grains, with at least one of the electrodes being permeable to radiation of an electromagnetic or corpuscular nature. The invention further relates to methods of manufacturing such monograin layers.

Such electrical devices made up of photoconductive or photovoltaic grains are useful as radiation detectors. When radiation energy impinges upon the active grains, an electromotive force or impedance difference is produced, which can be detected by means of the electrodes arranged on the layers, one of which will be permeable to the radiation. Such devices are also useful for converting radiation energy into electrical energy, for example, a solar cell. Another application for devices according to the invention is the conversion of electrical energy into radiation energy, as this may be effected, for example, by recombination radiation in a junction of a semiconductor grain, by electroluminescence, and so on.

In all these cases it is advantageous to use layers of grains which have a thickness of substantially only one grain, since in this case the contact resistances between the grains are avoided, and in addition the efficiency, owing to the lack of grains screened against radiation by other grains, and also the ratio of weight and material consumption to the active surface are optimal. Thus, the problem arises that at least one electrode contact provided on the sensitive and active layer must satisfy two contradictory requirements, namely that this electrode on the one hand must have little lateral electric resistance, and on the other hand must exhibit little or no obstruction for the radiation incident upon or emerging from the layer. Efforts have been made to solve this problem by using materials which have a sufficiently large permeability to the radiation used, but also a high electrical conductivity. The drawback of such solutions is that the choice of material is restricted, for example, to materials as indium oxide and tin oxide. In addition, the electrical conductivity of such materials, although useful in certain cases, generally is considerably lower than that of the metals normally used for electrodes. Another possible solution is the use of metal layers which are so thin that the radiation is absorbed only to a very small extent. However, in this case, electrode surfaces of any extent already cause the lateral resistance to become inadmissibly high. In addition, the small mechanical rigidity of such thin electrodes may be disadvantageous.

The invention is based, among other things, on the recognition that the above drawbacks associated with known solutions can be avoided by providing an electrode layer having an inhomogeneous structure, in the sense that the parts on the active grains are readily permeable to the radiation used, whereas the parts between the grains on the filler are more highly conductive and less permeable.

An electrical device according to the invention is characterized in that the electrode layer which is permeable to radiation comprises a pattern or array of coherent electrically highly conductive regions which are less permeable to the radiation and less highly conductive regions which are more permeable to the radiation, with the parts between the grains on the filler are more highly conductive and less permeable.

An electrical device according to the invention is characterized in that the electrode layer which is permeable to radiation comprises a pattern or array of coherent electrically highly conductive regions which are less permeable to the radiation and less highly conductive regions which are more permeable to the radiation, with the more permeable regions intended for passing the radiation being provided on the grains, and the less permeable regions intended to reduce the electrical resistance being provided in the interstices between the grains on the filler. A radiation-permeable electrode layer composed in the manner described above is particularly suitable for use on monograin layers since no photosensitive or photoactive material is arranged between the grains so that impermeable electrode material may be provided there.

For the highly permeable electrode regions, materials such as indium oxide or tin oxide are suitable, whereas for the highly conductive regions, a metal layer having a lower resistivity may be used, in which case the layer regions may have the same thickness. However, the difference in radiation permeability and electrical conductivity is preferably obtained at least partially by thickness variations. The highly permeable regions are constituted by a thinner portion of the electrode layer, and the highly conductive regions are constituted by a thicker portion of the electrode layer. The thin and thick portions of the layer may be of different materials, if required, having different permeabilities and/or conductivities. However, for technical reasons, it may be of advantage sometimes that the thinner and thicker portions of the electrode layer are of the same material.

The invention may be applied to layers, the grains of which are locally sintered together and are partly connected by a filler. The invention is preferably applied to layers of grains cohering by means of an eletcrically substantially insulating filler serving as a binder for the grains.

Electrical devices in accordance with the invention may further have advantageously a self-supporting construction in order to save weight. If required, the device may alternatively be provided on a support, for example, to improve the mechanical rigidity.

The use of an electrical device according to the invention is of importance in all those devices in which it must be possible for radiation to impinge upon or emerge from a layer of grains. For example, the invention may be applied to layers of grains capable of emitting electromagnetic radiation under the influence of a voltage applied across the electrodes, which radiation is located at least partially within the frequency range which can be passed by at least one of the electrodes. This includes all kinds of electroluminescence, for which purpose the grains used must be prepared and connected to contacts in known manner. In particular may be mentioned the so-called injection luminescence in which charge carriers of opposite type, which emit radiation when recombining, are injected into the grain by means of the electrode layers. According to another preferred embodiment of an electrode system according to the invention, the grains comprise a p-n junction between the electrode layers, which junction can emit recombination radiation under the influence of a voltage applied in the forward direction. Although injection and luminescence can also be obtained in a different manner, for example, by means of metal semiconductor contacts, injection by means of a p-n junction is to be preferred in many cases.

The electrical device may further be constructed as a radiation-sensitive device in which the layer of grains is constituted by radiation-sensitive grains which, under the influence of radiation, will experience an impedance variation. Such devices may be used, for example, as photo-resistors in which case the grains consist of a photoconductive material. In another construction of such a device according to the invention, the layer of grains is constituted by radiation-sensistive grains comprising a p-n junction between the electrode layers, so that a photo-EMF can be produced by incident radiation as is desired, for example, in a solar cell, or in which grains the p-n junction is connected as photodiode in the reverse direction.

The average grain diameter used in the known electrical devices may have differing values. However, in the manufacture of electrical devices according to the invention, grains are preferably used having an average diameter smaller than 100 microns, and preferably smaller than 50 microns.

The invention also relates to methods of manufacturing an electrical device of the type described. According to a first suitable embodiment of a method according to the invention, the permeable electrode layer is formed by providing a highly conductive, coherent, continuous, porous electrode layer on the layer of grains with filler from which the grains partly project. The layer is then contacted with a solvent or etching agent which penetrates through the pores and selectively etches away the free portions of the grains in such manner that the cohesion between the electrode layer and the grains is interrupted at least for the greater part and the portions of the electrode layer located on the grains are removed. Afterwards, an electrode layer which is less conductive and more permeable to the radiation is provided at least on the grains. It is of particular advantage to use an etchant which causes evolution of gas during the reaction between the grain and the etchant, which gas evolution further promotes the detaching of the electrode layer from the grains. With this method in which the upper parts of the grains are freed from the electrode layer by etching, it is possible to provide the highly conducting electrode layer directly on the layer of grains. However, it is recommended in general that, prior to the provision of the highly conductive porous electrode layer, the layer of grains with filler is subjected to a pretreatment to facilitate the selective removal of the electrode layer from the heads of the grains. For example, the free portions of the grains may be subjected to a pretreatment in which the surface of the grains is roughened mechanically or chemically. As a result of this, the highly conducting electrode layer provided subsequently on the grains, for example, by vapor deposition, will exhibit a stronger porosity than on the filler as a result of the "shadow effects" of the unevenness present on the rough surface of the grains. In the subsequent etching process, the etching liquid will therefore reach the grains more easily, as a result of which the selective removal of the electrode layer from the grains is promoted. Alternatively, the pretreatment may comprise the formation on the grains of a layer of a material which can be removed selectively by the etchant. This may be effected, for example, by chemically converting a surface layer of the grains into a material which can be removed selectively by etching, or by depositing on the grains, for example, by means of the so-called electroless plating process, a metal layer which can easily be removed selectively by an etchant. This has the advantage that when an etchant is used which attacks the surface layer formed but does not attack the grains themselves, the etching time is not critical and etching may be continued until the free portions of the grains are entirely cleaned. Such a pretreatment may particularly advantageously be applied to sulphide grains, the pretreatment chemically converting superficially the free portions of the grains into sulphur.

Another method of manufacturing an electrical device according to the invention uses photographic methods, and is characterized in that the desired pattern in the permeable electrode layer is formed with the use of a photoresist. A photoresist layer is provided on one side of the layer of grains with filler from which the grains project partly, which photoresist layer is sensitive in a spectral region in which the grains and filler exhibit different permeabilities and in which by exposure through the opposite side of the layer of grains the photoresist layer is selectively hardened or made soluble as a result of the said difference in permeability according to a pattern corresponding to the pattern to be formed in the electrode layer. In this connection, it is to be noted that a photoresist is to be understood to include the normal photochemical substance used in photoresist methods. These include a negative photoresist which, by a photochemical process, is hardened selectively at the exposed places and becomes insoluble in the associated developer, but remains soluble at the unexposed places, and a positive photoresist which by a photochemical process becomes soluble selectively at the exposed places in the associated developer, but remains insoluble at the unexposed places. Of course such a method can be used only in those cases in which, for the wavelength range in which the photoresist used can be hardened, there exists a significant difference in permeability between the grains and the filler, preferably such that in the spectral region for which the photoresist is sensitive, the grains are less permeable than the interlocated filler.

There are various ways of using this photoresist method. According to a first preferred embodiment, a positive photoresist layer is provided on the layer of grains on the side of the free parts of the grains and exposed such that the photoresist layer becomes soluble selectively in a developer according to the pattern between the grains, the exposure taking place through the opposite side. The soluble parts of the photoresist layer are then removed by means of a developing process. Subsequently, a highly conductive, porous electrode layer is provided on the assembly, after which the layer is contacted with a liquid which penetrates through the pores and has the property of dissolving parts of the photoresist layer which remained insoluble in the developer, so that these parts of the photoresist layer on the grains, with the electrode layer present thereon, can be removed. Afterwards, the more highly permeable electrode layer is provided at least over the grains.

According to a second preferred embodiment of the photoresist method, the permeable electrode layer is first provided. The method according to the invention is performed so that the electrode layer which is permeable to the radiation and is in a satisfactory electrical contact with the grains is provided on the layer of grains on the side of the free parts of the grains. A positive photoresist is provided over the electrode layer. The photoresist between the grains is rendered selectively soluble in a developer by exposure through the permeable electrode layer, after which the said parts of the photoresist layer are removed by means of a developing process. A higher conductive, less permeable, porous electrode layer is then provided on the assembly, after which it is contacted with a liquid which penetrates through the pores and has the property of dissolving the parts of the photoresist layer which are not soluble in the developer, so that the parts of the photoresist layer on the grains with the higher conductive electrode layer present on it can be removed.

According to another preferred embodiment of the photoresist method, the method is carried out with a negative photoresist layer provided on the layer of grains, on the side of the free parts of the grains. The photoresist layer between the grains is selectively hardened by exposure through the opposite side. A higher conductive, porous electrode layer is then provided on the photoresist layer, after which the said electrode layer is contacted with a liquid which penetrates through the pores and by which the unhardened parts of the photoresist layer on the grains with the higher conductive electrode layer present thereon are removed by means of a developing process. Then a permeable electrode layer is provided at least on the grains. The latter is electrically in satisfactory contact with the grains and is of lower conductivity than the layer is connects which is present on the hardened total resist and is more highly conductive and less permeable.

The permeable lower conductive electrode layer can be provided in various ways, for example, by vapor deposition, but it may be provided in a different manner also. For that purpose, according to a preferred embodiment of the method according to the invention, the lower conductive electrode layer which is more permeable to the radiation is formed on the grains by chemical conversion of their surface layer into a layer consisting of an electrically conducting material. As a result of this, the permeable electrode layer is selectively provided on the grains.

As already noted, the construction of a device according to the invention as well as the method according to the invention may particularly advantageously be applied to monograin layers of small diameter, for example, layers having an average grain diameter smaller than 100 microns or even smaller than 50 microns, although the invention is not restricted to such a small diameter.

Figure 2:
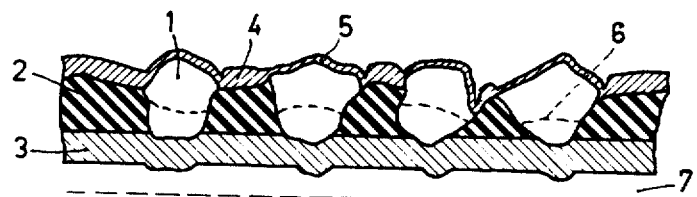
Figure 3:
Figure 4:
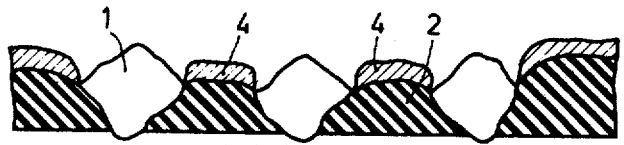
Figure 5:
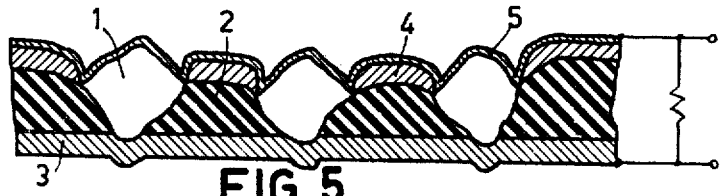
Figure 6:
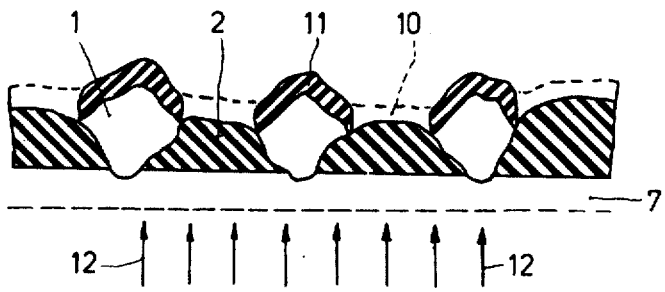
Figure 7:
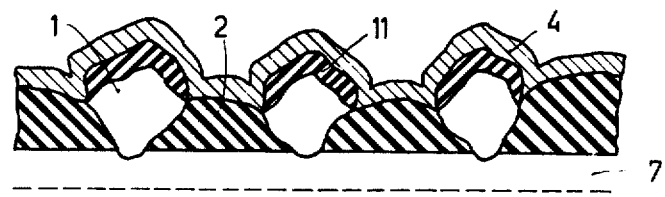
Figure 8:
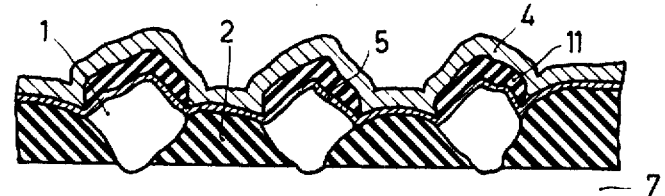
Figure 9:
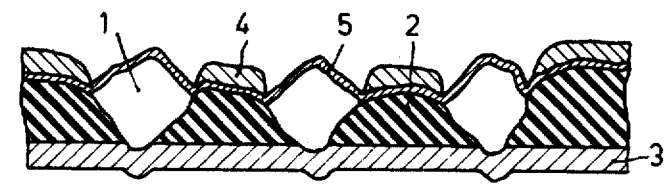
Figure 10:
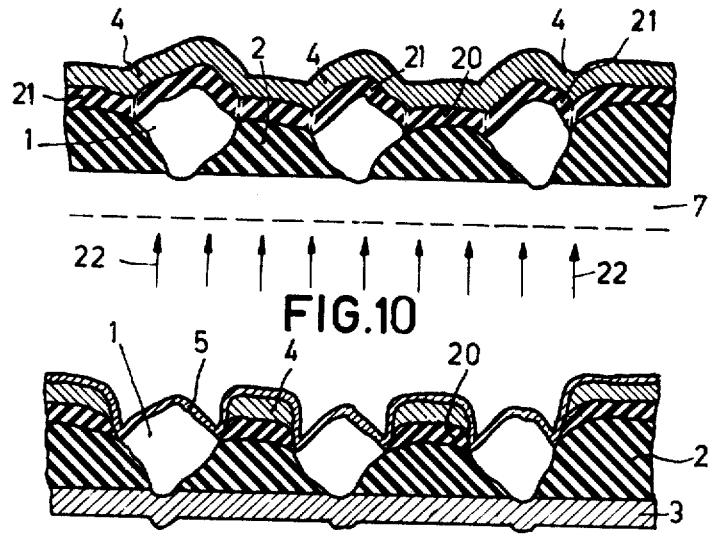
Figure 11:
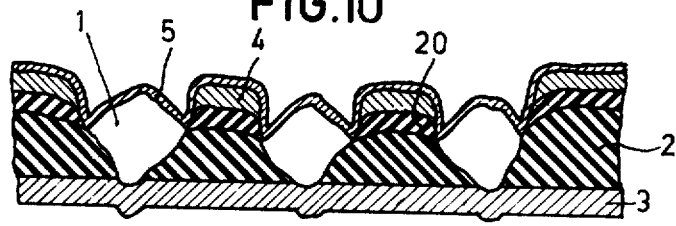
Figure 12:
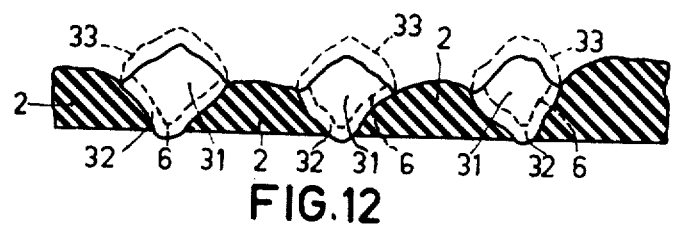
Figure 13:
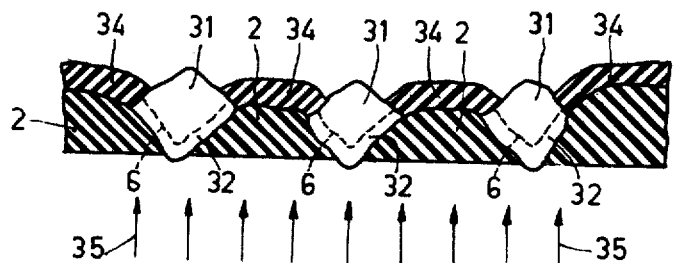
Figure 14:
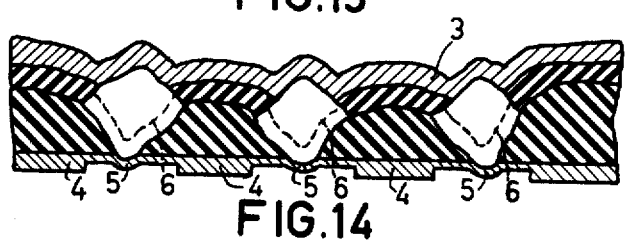

In order that the invention may readily be carried into effect, several examples thereof will now be described, by way of example, with reference to the accompanying drawing wherein: FIG. 1 diagrammatically shows a plan view of an example of an electrical device according to the invention; FIG. 2 diagrammatically shows a cross-sectional view along the line II—II of the device shown in FIG. 1; FIGS. 3, 4 and 5 are diagrammatic cross-sectional views of an example of a device according to the invention in successive stages of manufacture; FIGS. 6 and 7 are diagrammatic cross-sectional views of another embodiment of a device according to the invention in successive stages of manufacture; FIGS. 8 and 9 are diagrammatic cross-sectional views of a third example of a device according to the invention in successive stages of manufacture; FIGS. 10 and 11 are diagrammatic cross-sectional views of a fourth example of a device according to the invention in successive stages of manufacture; FIGS. 12, 13 and 14 are diagrammatic cross-sectional views of a fifth embodiment of a device according to the invention in successive stages of manufacture.

In the example illustrated in FIGS. 1 and 2, a layer which has a thickness of only one grain is used as the starting material and consists of grains 1 of, for example, photoconductive cadmium sulphide having an average thickness of, for example, 30 microns, cohering by means of an electrically substantially insulating binder 2, consisting, for example, of an epoxy resin or a hardened photoresist. The binder 2, which is the filler referred to above, extends only over a part of the thickness of the layer so that portions of the grains 1 project above and below the binder on either side of the layer thus permitting contacts 3, and 4, 5 with the active grains 1. The layer of grains is covered on one side with a rather thick bottom electrode layer 3, for example, an indium layer having a thickness of approximately 0.3 micron. On the other side the layer of grains is covered with an electrode layer 4, 5 intended for passing radiation in the visible region of the spectrum. For that purpose, according to the invention, the top electrode layer consists of higher conductive, less permeable, mutually coherent regions 4 on the filler 2 between the grains 1 and lower conductive, more permeable regions 5 on the grains. In this embodiment, for example, the regions 4 may be formed by a layer of gold, of 0.1 micron thickness, having a layer resistance of approximately 0.24 ohm per square, and an absorption of approximately 99.5% for radiation having a wavelength of 5000 A. The regions 5 may be formed, for example, by a copper layer, 100 A. thick having a layer resistance of approximately 0.7 ohm per square, and an absorption of approximately 45% for radiation having a wavelength of 5000 A.

The composition pattern of the radiation-permeable top electrode layer is also shown in the plan view of FIG. 1 in which is also shown how the better conducting regions 4 cohere together and thus may serve as a low resistance current supply to the better permeable region 5.

The regions 4 and 5 of the top layer may consist entirely of different materails, in which, for example, the parts 5 of copper may be provided selectively only on the free portions of the grains 1. However, in manufacturing, it may be simpler and it is also possible without any objection to provide the layer 5, which is usually thinner, throughout the entire surface of the layer of the grains, and filler 2, so that thus the thicker parts 4 of the layer in the latter case will consist of the original 0.1 micron thick layer of gold plus the 100 A. thick layer of copper.

For use as a photoresistor, the grains 1 may consist, for example, of substantially homogeneous cadmium sulphide crystallites having a high dark resistance, for example, activated with approximately $10^{-4}\%$ by weight of copper and gallium in a known manner. The composition and the way of providing the electrode layers 3 and 4, 5 may be chosen in known manner so that they substantially form ohmic connections with the grains 1.

A layer of grains 1 having rectifying properties, to be used, for example, as a solar cell, photodiode or radiation source, can be obtained by choosing one of the two electrode layers 3 and 4, 5 to form a rectifying junction with the grain, for example, after indiffusing some of the electrode material, or by using a layer of grains in which the grains 1 between the electrodes 4, 5 and 3 include a p-n junction, as denoted by the broken line 6 in FIG. 2. The jnction 6 may also form the boundary between two regions of the grains of the same conductivity type but with different resistivity when one of the electrodes forms a rectifying connection. A more detailed example hereof will be described in greater detail.

The layer of grains 1 with the electrodes 3 and 4, 5 may be self-supporting, or be arranged on a support 7 which is denoted by a broken line in FIG. 2.

Several examples of methods according to the invention for the manufacture of the above electrical devices will now be described in greater detail. In the Examples I to V to be described, a layer of grains which corresponds to that of FIG. 1, with the electrodes 3 and 4, 5 omitted, will always be used as the starting material. Such a layer having the thickness of one grain, which may be considered to be the starting point for the methods according to the invention to be described below, may be obtained, for example, in the following manner, as is described in my copending application, Ser. No. 569,170, filed Aug. 1, 1966, the contents of which are herein incorporated by reference.

On a transparent support, for example, a glass plate, a liquid layer of a readily water-soluble adhesive is provided, for example, a solution of 100 g. of sacharose and 10 g. of glucose in 50 cc. of water, to which solution approximately 0.3 g. of a wetting agent on the basis of esterified sulphonated fatty acids may be added. Before applying the layer of adhesive, the glass plate is preferably covered first with a thin, for example, monomolecular, layer of lecithin tin. This promotes afterwards the creepage of water between the glass plate and the layer of adhesive as a result of which the dissolution of the latter is considerably accelerated. The layer of adhesive is provided by dipping or in a different manner and may have a thickness of, for example, 5 microns, which is smaller than half the average diameter of the grains. Grains of cadmium sulphide having an average diameter of 30 microns are provided on the still liquid layer of adhesive and sunk into the said layer, if required under pressure, after which the layer of adhesive is allowed to dry. As a result of this, the lower layer of grains adheres to the glass plate. After drying the layer of adhesive, the non-adherent excess grains may be shaken or blown from the plates so that a layer remains which has the thickness substantially of only one grain. This layer is then coated with a layer of a negative photoresist, for example, the commercially available Kodak Photo Resist (KPR) having a thickness of about 10–20 microns, but thinner than the average thickness of the grains. After drying, the photoresist is exposed through the glass plate with, for example, a high pressure mercury lamp at a distance of approximately 20 cms., for such a long period of time, for example, 10 minutes, that the photoresist layer is hardened throughout its thickness in those regions which are located between the grains, while the radiation does substantially not reach the photoresist present on the grains as a result of absorption in the grains. By means of a developing process, the photoresist on the grains is selectively removed, the hardened photoresist remaining between the grains as a binder.

The resulting layer of grains, which is adhered to the support, is used as the starting material in the examples to be described. The permeable electrode layer is provided on the side of the layer of grains remote from the support by means of the methods according to the invention. The layer of adhesive between the glass plate and the layer of grains is then dissolved in water, solution being promoted by the lecithin layer, as a result of which the layer of grains is detached from the support. A second electrode layer 3 is then provided on this side of the layer of grains in contact with the portions of the grains that project from the binder.

Example I

For this example, the grains 1 consist of a known cadmium sulphide activated with approximately $10^{-4}\%$ by weight of copper and gallium. The layer of grains is first subjected to a pretreatment, in which the layer of grains 1 is contacted with dilute nitric acid. As a result (FIG. 3), the cadmium sulphide in the outer layer 8 of the grain 1 is converted into sulphur, the surface of the layer 8 of the sulphur being rough compared with the original smooth crystal surfaces of the cadmium sulphide grains and the adjacent binder surface 2. A readily conducting porous electrode layer 4 is provided on the thus prepared layer of grains, for example, by vapor-depositing a layer of gold of 0.1 micron thickness. The side of the layer of grains covered with the layer 4 of gold is then contacted with an etchant consisting, for example, of a saturated solution of sodium sulphite at 80° C. This solution penetrates through the pores of the gold layer 4 and selectively dissolves the sulphur layer 8 on the grains, as a result of which the layer 8 together with the portions of the gold layer 4 provided on it are simply automatically removed, or if required, using a slight rubbing action, so that the situation depicted in FIG. 4 is obtained in which the top portions of the grains 1 are free of the gold layer 4.

A transparent copper layer 5 (see FIG. 5) of only 100 A. thickness is then provided, for example, by vapor-deposition, on the whole upper side of the layer consisting of the portions 4 of the layer and the free portions of the grains 1. In this case, it may be of advantage to clean the exposed portions of the grains with a solvent or an etchant which does not attack the gold layer 4, for example, a dilute hydrochloric acid solution, before providing the layer 5. The layer of grain 1 with the electrode layers provided on it is then removed from the support by dissolving the layer of adhesive, after which a homogeneous non-transparent metal layer, for example, an indium layer 3 of 0.3 micron thickness, is provided on the thus exposed side of the layer of grains 1, which metal layer forms an ohmic connection with the grains 1.

The permeable electrode layer now consists of permeable, lower conductive regions on the grains 1 constituted by the copper layer 5, and higher conductive, less permeable, mutually adhering regions 4, 5 between the grains. These latter regions are formed by the juxtaposed layers 4 and 5 and serve for supplying current to the permeable regions 5 on the grains. The copper layer 5 forms a rectifying connection with the grains, so that a solar cell is obtained, on which radiation can be incident on the upper side through the electrode layer 4, 5. FIG. 5 shows, schematically, a load circuit connected across the two electrodes.

Instead of the formation of the sulphur layer 8, which is an example of simultaneous surface roughening and selective etching, the grains may be subjected to a surface treatment in which, for example, by means of an electroless plating process, the exposed heads of the grains are selectively covered with a metal layer. The metal layer, which may, for example, be of Cd or Zn, can then be removed selectively in a manner analogous to that of the sulphur layer 8 by etching with an acid penetrating through the pores in the gold layer 4, for example, a 15% hydrochloric acid solution, if required assisted by slight rubbing. Surface treatments in which a layer 8 to be etched away selectively is formed on the grains 1 have the advantage that the duration of the etching period to remove the subsequently provided gold layer 4 from the grains is less critical.

The superficial roughening of the layer 1 could, in circumstances, also be effected without the formation of the layer 8 to be etched away selectively, for example, by selectively etching the grains 1, for example, chemically with dilute hydrochloric acid, in such manner that a rough grain surface is formed. The rougher grain surface promotes the etching action and thus the selective removal of the gold from the grain tops.

Although the above-mentioned surface treatments, which are to be considered as pretreatments, are preferred, the etching method may also be used without such pretreatments, but in that case, the duration of the etching treatment will have to be controlled more accurately. For example, the porous gold layer 4 may be provided directly on the layer of grains. The cadmium sulphide grains 1 are then etched away selectively with a 15% hydrochloric acid solution which penetrates through the pores in the gold layer 4, in which also owing to the evolution of gaseous hydrogen sulphide the gold layer 4 is loosened from grains 1 and is removed, if required while applying a slight rubbing action.

In the example described above, the permeable copper layer 5 was provided over the whole layer of grains 1 after exposing the upper ends of the grains. However, it is also possible to provide the layer 5 selectively on the heads of the grains instead of over the whole layer by contacting them with a solution of a copper salt, for example, copper sulphate. As a result of this, the cadmium is substituted by copper on the exposed parts of the grains so that selectively a thin permeable conductive electrode layer 5 consisting of copper sulphide is formed on the grains.

Example II

On a layer of grains with binders (see FIG. 6) with the grains 1 projecting from the binder 2, a layer 10 is provided of a positive photoresist (for example Kalle Kopierlack P/RE 2327/50 obtainable from Kalle A. G. Wiesbaden, Western Germany) having a thickness of, for example, 1 micron. The photoresist is then exposed, if required through a transparent support 7, in the direction of the arrows 12 to radiation of such a wavelength and intensity and for such a long period of time that the photoresist regions 10 between the grains 1 become soluble selectively while the photoresist regions 11 on the grains which blocks the radiation remain insoluble. It is naturally required for this purpose that the grains 1 are less permeable to the radiation in question than the binder 2. This requirement is fulfilled with illumination provided by a high pressure mercury lamp at a distance of 20 cms., duration of exposure about 5 minutes, when the layer consists of grains 1 of cadmium sulphide embedded in a layer of the aforementioned Kodak resist as a binder 2.

After exposure, the photoresist layer 10, 11 is developed, as a result of which the photoresist 10 between the grains is removed and caps of photoresist 11 remains on the grains. Thus, a patterns of positive photoresist is obtained, which corresponds to the ultimately desired pattern of the electrodes.

As shown in FIG. 7, a rather thick, porous gold layer 4, thickness 0.1 micron, is then provided over the assembly. The porous gold layer 4 is then contacted with, for example, acetone which swells and dissolves the resist caps 11. The acetone penetrates through the pores of the gold layer 4, and as a result of the dissolution of the photoresist caps 11, these caps with the portions of the gold layer 4 located on them are removed, if required with a slight rubbing action. In principle, the resulting configuration corresponds to that of FIG. 4, already described in the previous example. In a manner analogous to that of the preceding example (see FIG. 5), a thin permeable electrode layer 5, for example, a copper layer, thickness 100 A., is then provided over the assembly. Finally, an electrode layer 3, for example, an indium layer of 0.3 micron thickness, is finally provided on the opposite side of the layer of grains 1.

The starting material of this example, and the following examples, is a layer of grains of which the grains 1 are less permeable in the spectral region for which the photoresist is sensitive than the filler or binder 2. However, in certain circumstances it is also possible to start from permeable grains 1 cohering by means of a less permeable binder 2, in which case a negative photoresist is used in the manufacture of the permeable electrode layer instead of a positive photoresist.

Example III

According to a variation of the method of Example II, the permeable copper layer 5 (see FIG. 8) is not provided at the end of the method, but as the first operation before providing the positive photoresist 11. Caps 11 of insoluble positive photoresist are then formed on the layer 5 above the grains 1 in a manner analogous to that described with reference to FIG. 6 of Example II. In connection with the absorption in the layer 5, a stronger intensity and/or longer exposure time will be required than in Example II dependent upon the properties of the permeable layer 5. As shown in FIG. 8, a porous gold layer 4, for example, 0.1 micron thick, is then again provided on the assembly and then removed selectively above the grains 1 (see FIG. 9) with acetone penetrating through the pores, in the manner described in Example II. Finally, an electrode layer 3, for example, an indium layer, 0.3 micron thick, is provided on the opposite side of the layer of grains by vapor deposition, the structure as shown in the cross-sectional view of FIG. 9 being obtained.

Example IV

In another method according to the invention (see FIG. 10), a layer of grains 1, as described above, is covered on one side with a layer 20, 21 of a negative photoresist, for example, Kodak Photo Resist known as KPR, of, for example, 10 microns thickness. The photoresist layer 20, 21 is then exposed through the opposite side, and if required, through a transparent support 7, in the direction of the arrows 22 by a high pressure mercury lamp at a distance of approximately 20 cms, as a result of which the regions 20 between the grains on the binder 2 becomes insoluble, whereas the regions 21 on the grains which were not or hardly exposed due to absorption in the grains 1, remains soluble. A readily conducting porous gold layer 4, 0.1 micron thick, is then provided over the photoresist layer 20, 21. The layer 4 is then contacted with a developer which penetrates through the pores and causes the resist 21 on the grains 1 to swell considerably more strongly than the hardened portions 20 between the grains. As a result of this, the photoresist 21 on the grain with the portions of the gold layer 4 provided on it are removed, if required, assisted by a slight rubbing action. The hardened resist 20 (see FIG. 11) remains between the grains 1 with the portions of the layer 4 covering it. A permeable copper layer 5, 100 A. thick, is then provided on the assembly by vapor deposition, or by another suitable method, while in addition, the opposite side of the layer of grains is provided with an indium layer 3, 0.3 micron thick, so that the structure as shown in the cross-sectional view of FIG. 11 is obtained. In this method also a photoresist is used, in which the pattern to be formed of thick portions 4 and thin portions 5 of the electrode is obtained by using the difference in permeability of the grains 1 and the binder 2.

Example V

Finally, an example is described of a method of manufacturing an electrical device according to the invention in which the grains (see FIG. 12) comprise a junction 6 between two different materials 31 and 32. The grain consists for example, of a core 31 of n-type material, for example, n-type cadmium telluride, and an enveloping layer 32 of p-type cadmium telluride separated by a p-n junction 6.

The p-type layer 32, which in FIG. 12 envelopes only a part of the grain, in the starting material enveloped the whole grain (see the broken boundaries 33) and has been obtained, for example, by in-diffusion of phosphorus. Such grains which comprise a p-n junction are used, for example, as a source of recombination radiation or for converting radiation energy into electrical energy, for example, in solar cells. Using these grains as the starting material, first a layer of one grain thickness, with photoresist as the binder 2, is formed having the grains projecting from the binder on opposite sides. The grains are then etched away on one side of the layer, for example, with concentrated potassium hydroxide solution, until the layer 32 has disappeared at that area and the core 31 is exposed. On the side with the etched-away grains, again a layer of negative photoresist 34 (see FIG. 13) is then provided having a thickness of a few microns, after which exposure is again effected from the opposite side in the direction of the arrows 35 and developing is carried out. As a result of this, the hardened photoresist 34 covers the p-n junction 6 exposed by the etching. In fact, as a result of diffraction phenomena, also those portions of the photoresist 34 which are located immediately at the edge of the "shadow of the grain" inside the said shadow are hardened by the exposure. To obtain the said effect, it is also possible to use diffused exposure. On the resulting layer of grains, where on one side the core 31 and on the other side the enveloping layer 32 is accessible for contacting, a permeable electrode layer 4, 5 and a non-permeable electrode layer 3 are provided according to the methods described (see FIG. 14) between which electrode layers all the p-n junctions in the grains 31, 32 are connected in parallel. It will depend upon the structure of the grains 31, 32 and on the purpose to be obtained whether the permeable electrode layer 4, 5 contacts the core 31 or the outer layer 32. The latter will in general be desirable if the grains 31, 32 comprise a radiation sensitive p-n junction 6, as in the case in the present example.

Finally, it is noted that the invention is not restricted to the examples described, but many variations are possible within the scope of the present invention. For example, instead of a photoresist as a binder, other types of binder may also be used. For example, the starting material may be a layer of grains formed by providing on a conductive support a liquid layer of, for example, an epoxy resin and sinking the grains in it until they contact the electrode layer, after which the layer of resin is hardened and ground to form a layer which is only one grain thick, and in which the grains become accessible with a diameter suitable for contacting. The electrical device according to the invention may then be applied to the upper side. In this case, also layers of grains (see FIG. 2) which comprise a p-n junction 6 which is not parallel to the surface of the grains may be used as the starting material, subject to the grains being covered by the binder 2 at the area where the p-n junction reaches the surface of the grains.

The thin and thick regions of the electrode layer generally consist both of metallic layers. It will be clear that the above-mentioned method may also be used in those cases in which the grains, at least at the surface, have such a high conductivity that the provision of the thin layer may be omitted.

In addition, in order to improve the rigidity, usually a layer is provided of a hardening synthetic material which is permeable within the wavelength range in which the electrical system is operated after having provided the permeable electrode layer. The operation of making the layer of grains self-supporting, succeeded by the provision of the non-permeable electrode layer 3, is then effected after providing and hardening this layer of synthetic material, so that during and after these operations, no danger exists of damage or breakage.

While in the examples described, the bottom electrode or current supply 3 is shown as a metal contact, there may be constructions wherein the latter is replaced by a flow of charged particles, such as ions or electrons, which are impinged on the bottom surfaces of the grains to effect a current supply or charge transport thereto; hence the term "electrode" as used herein should be accorded a meaning commensurate with the function required to be carried out by this lower electrode.

It will further be evident that the invention is not limited to the specific active materials recited in the several examples described above. In general, all semiconductive materials, whether monocrystalline or polycrystalline, which are available in granular form, i.e., in small pieces or particles, for example, crystallites, and exhibit a property sensitive to radiation or which generate radiation are suitable for use in the device of the invention. Such materials include, for example, Si, Ge, GaAs, GaP, and the sulphides, selenides and tellurides of cadmium, zinc and lead. As is evident, the method of the invention is concerned with the technique for producing the inhomogeneous electrode layer and the choice of active materials and electrode materials is not critical within the broad scope of my teachings, though certain combinations of materials are preferred because of the superior results obtained. Nor for that matter are the deposition techniques for the various electrode materials critical. Where it is indicated that the layer as applied is porous, it will be understood that no special steps are necessary to achieve this result. In the layer thicknesses indicated, and even for thicker layers, conventional vapor-deposition techniques, such as vacuum evaporation from a point source, will produce a layer on the uneven surface of the grains that is of sufficient porosity to allow the etchant or solvent to easily penetrate same. Thus, the layer thicknesses given are merely illustrative and should not be considered as limiting the scope of my invention.

While I have described my invention in connection with specific embodiments and applications, other modifications thereof will be readily apparent to those skilled in this art without departing from the spirit and scope of the invention as defined in the appended claims.

What is claimed is:

1. An electrical device comprising a pair of electrodes and between the electrodes and in contact therewith a layer of electrically active grains receiving or responsive to radiation or capable of generating radiation, said layer having substantially the thickness of one grain and having at least some spaces between the grains, said layer including in the said spaces over only part of the grain thickness an electrically insulating filler, at least one of said electrodes being permeable to radiation, said one electrode comprising an array of cohering first regions exhibiting relatively high electrical conduction but relatively low permeability to the radiation located over the spaces between the grains and second regions connected to the first regions and exhibiting relatively low electrical conduction but relatively high permeability for the radiation located over the grains.

2. A device as set forth in claim 1 wherein the active grains exhibit the property of generating radiation to which said one electrode is permeable in response to the establishment of an electric field across the grains, and means are provided for applying a voltage across the electrodes.

3. A device as set forth in claim 2 wherein the grains each include a p-n junction, and the voltage applied has a polarity biasing the junctions in the forward direction.

4. A device as set forth in claim 1 wherein the active grains exhibit the property of changing impedance in response to radiation to which said one electrode is permeable, and means are provided coupled to the electrodes for sensing the impedance change.

5. A device as set forth in claim 1 wherein the active grains contain p-n junctions and exhibit the property of generating a voltage in response to radiation to which said one electrode is permeable, and means are provided coupled to the electrodes for sensing the generated voltage.

6. A device as set forth in claim 1 wherein the active grains have an average diameter smaller than 50 microns.

7. An electrical device comprising a pair of electrodes and between the electrodes and in contact therewith a layer of electrically active semiconductive grains receiving or responsive to radiation or capable of generating radiation, said layer having substantially the thickness of one grain and having spaces between the grains and including in the said spaces over only part of the grain thickness an electrically insulating binder cohering the grains together, at least one of said electrodes being permeable to radiation, said one electrode comprising an array of cohering first regions and second regions, said first regions being thicker than said second regions, said thickness dimension being measured in the same direction as that of the layer thickness, said thicker first regions providing relatively high electrical conduction but relatively low permeability to the radiation and being located over the spaces between the grains, said thinner second regions providing relatively low electrical conduction but relatively high permeability for the radiation and being located over and in contact with the grains.

8. A device as set forth in claim 7 wherein the first and second regions are of the same material.

9. A device as set forth in claim 7 wherein the layer is self-supporting.

10. A device as set forth in claim 7 wherein the grains have an average diameter smaller than 100 microns.

11. A device as set forth in claim 10 wherein the grains are constituted of a bivalent metal chalcogenide material.

12. An electrical device comprising a pair of electrodes and between the electrodes and in contact therewith a layer of electrically active grains receiving or responsive to radiation or capable of generating radiation, said grains having an average diameter smaller than 100 microns, said layer having substantially the thickness of one grain and having spaces between the grains and including in the said spaces over only part of the grain thickness an electrically insulating binder cohering the grains together, at least one of said electrodes being permeable to radiation, the tops of said grains remote from the other electrode having electrically conductive surfaces, said one electrode comprising an array of cohering regions forming openings over the said tops of said grains, said electrode regions exhibiting relatively high electrical conduction but relatively low permeability to the radiation and being located over the spaces between the grains and being in contact with the electrically conductive surfaces of the grain tops.

References Cited

UNITED STATES PATENTS

| | | | |
|---|---|---|---|
| 2,537,255 | 1/1951 | Brattain | 29—572 X |
| 2,537,257 | 1/1951 | Brattain | 29—572 X |
| 2,777,040 | 1/1957 | Kazan | 29—572 X |
| 2,904,613 | 9/1959 | Paradise | 29—572 X |
| 3,038,952 | 6/1962 | Ralph | 136—89 |

JAMES W. LAWRENCE, Primary Examiner

PALMER C. DEMEO, Assistant Examiner

U.S. Cl. X.R.

29—572; 136—89; 313—108; 317—235-27

UNITED STATES PATENT OFFICE
CERTIFICATE OF CORRECTION

Patent No. 3480818                                      Dated November 25, 1969

Inventor(s) T. S. TE VELDE

It is certified that error appears in the above-identified patent and that said Letters Patent are hereby corrected as shown below:

Col. 2, lines 19-26, delete ;

Col. 2, line 69, "ton" read --tion--;

Col. 3, line 29, "radiation-sensistive" read --radiation-sensitive--;

Col. 5, line 27, "...layer is con-" read --...layer it con- --

Col. 6, line 30, "materails" read --materials--;

Col. 9, line 28, "patterns" read --pattern--.

Signed and sealed this    28th   day of    July     , 1970   .

(SEAL)
Attest:

Edward M. Fletcher, Jr.
Attesting Officer

WILLIAM E. SCHUYLER, JR.
Commissioner of Patents